United States Patent [19]

Yasumatsu

[11] 4,211,377
[45] Jul. 8, 1980

[54] LOCKING DEVICE FOR A SEATBELT SYSTEM

[75] Inventor: Jun Yasumatsu, Toyota, Japan

[73] Assignees: Toyota Jidosha Kogyo Kabushiki Kaisha; Kabushiki Kaisha Tokai Rika Denki Seisakusho, both of Aichi, Japan

[21] Appl. No.: 873

[22] Filed: Jan. 4, 1979

[30] Foreign Application Priority Data

Mar. 24, 1978 [JP] Japan .............................. 53-38186[U]

[51] Int. Cl.² ...................... A62B 35/02; B65H 75/48
[52] U.S. Cl. ................................. 242/107.2; 188/65.1;
242/107.4 A
[58] Field of Search .................... 242/107.2, 107.4 R,
242/107.4 E, 84.8; 297/388, 385–387, 389;
188/65.1, 72.9, 188, 65.2, 65.3, 65.4, 65.5;
280/801–808

[56] References Cited

U.S. PATENT DOCUMENTS 3,578,259  5/1971  Zelnick ............................ 242/107.2
4,120,466  10/1978  Adomeit ........................... 242/107.2

*Primary Examiner*—John M. Jillions
*Attorney, Agent, or Firm*—Koda and Androlia

[57] ABSTRACT

A seatbelt locking device for a seatbelt system in a vehicle including a receiving member provided on a base, a pressing member pivotally supported adjacent the receiving member, an intermediate portion of the seatbelt extending between the receiving member and the pressing member and engaging with one end of the pressing member so that the intermediate portion of the seatbelt is pressed against the receiving member by the pressing member when the tension on the seatbelt exceeds some predetermined amount and a shock-absorbing member interposed between the receiving member and the base whereby deformation of the shock-absorbing member causes the receiving member to face in a direction from which the pressing force from the pressing member is received, thereby clamping a broad area of seatbelt between the receiving member and the pressing member.

6 Claims, 6 Drawing Figures

120# LOCKING DEVICE FOR A SEATBELT SYSTEM

BACKGROUND OF THE INVENTION

1. Field of the Invention

This invention relates to seatbelt systems and more particularly to locking devices for seatbelt systems.

2. Prior Art

Generally, a seatbelt system is designed such that one end of a passenger-restraining seatbelt is power retracted on a retractor fixed to the vehicle such that the tension is always applied to the seatbelt. Accordingly, an intermediate portion of the seatbelt kept in close contact with a passenger so that the passenger is restrained. When the passenger releases the seatbelt, most of the seatbelt is power retracted and stored in the retractor. Furthermore, within the retractor is provided a ratchet wheel which is attached to a retractor shaft on which the seatbelt is retracted in layers. Druing a vehicular emergency, a pawl is caused to engage with the ratchet wheel so that the rotation of the ratchet wheel and the retractor shaft in the direction of the extension of the seatbelt is abruptly halted. As a result, the extension of the seatbelt during a vehicular emergency is prevented such that the passenger is securely restrained.

However, in cases where the vehicle is provided with a so-called passive seatbelt system in which the passenger is automatically caused to don the seatbelt after entering the vehicle, the seatbelt is alternately caused to approach and move away from the passenger seat when the passenger enters or leaves the vehicle so that the space between the seatbelt and the passenger seat alternately expands and contracts. As a result, the amount of seatbelt retracted on the seatbelt retractor is extremely enlarged. As a result of this large amount of seatbelt retracted on the retractor shaft, a considerable length of seatbelt continues to be extended even after the rotation of the rotation shaft in the direction of seatbelt extension has stopped during the vehicular emergency until the seatbelt is tightly wound on the retractor shaft. Thus, in spite of the fact that the rotation of the shaft in the direction of the extension of the seatbelt is stopped, restraint of the passenger is incomplete whereby the safety of the passenger is not assured by the seatbelt system.

For this reason, a locking device is required which directly locks an intermediate portion of the seatbelt between the retractor shaft and the portion of the seatbelt which restrains the passenger. However, in cases where an intermediate portion of the seatbelt is locked, it is necessary that the broad area of the seatbelt be clamped in the locking device. Otherwise, stress will be concentrated on a small clamped portion and the seatbelt will be easily broken and result in a dangerous condition for the passenger during a vehicular emergency.

SUMMARY OF THE INVENTION

Accordingly, it is a general object of the present invention to provide a seatbelt locking device which makes it possible to lock a broad area of an intermediate portion of the seatbelt during a vehicular emergency so that a passenger is instantaneously and securely restrained.

Above mentioned object is accomplished by a unique seatbelt locking device for a seatbelt system in a vehicle including a receiving member provided on a base, a pressing member pivotally supported adjacent the receiving member, an intermediate portion of the seatbelt extending between the receiving member and the pressing member and engaging with one end of the pressing member so that the intermediate portion of the seatbelt is pressed against the receiving member by the pressing member when tension on the seatbelt exceeds some predetermined amount in a shock absorbing member interposed between the receiving member and the base whereby the deformation of the shock absorbing member causes the receiving member to face in a direction from which the pressing force from the pressing member is received thereby clamping a broad area of the seatbelt between the receiving member and the pressing member.

BRIEF DESCRIPTION OF THE DRAWINGS

The above-mentioned features and objects of the present invention will become more apparent with reference to the following description taken in conjunction with the accompanying drawings wherein like reference numerals denote like elements, and in which.

DETAILED DESCRIPTION OF THE INVENTION

Figure 1:
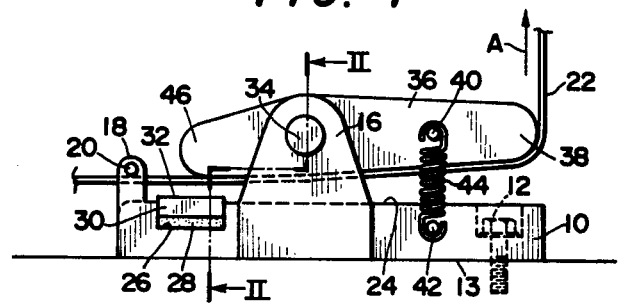
FIG. 1 is a side view which illustrates a first embodiment of the seatbelt locking device in accordance with the teachings of the present invention.
Figure 2:
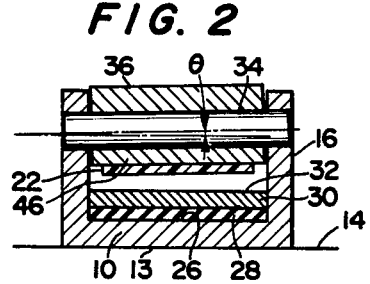
FIG. 2 is a cross sectional view along the line II—II in FIG. 1.

Referring to FIGS. 1 and 2, shown therein is a first embodiment of a seatbelt locking device in accordance with the teachings of the present invention. In the Figures, a back surface 13 of a fixed base 10 is fastened to the vehicle 14 by a plurality of fastening bolts 12. The fixed base 10 is in the form of a thick plate. Two brackets 16 project from either side of the plate which forms the thick base 10. Furthermore, guide brackets 18 which are smaller in size than the brackets 16 project from the end of the fixed base 10. A pin 20 is provided between the guide brackets 18 so that the seatbelt 22 is guided between the pin 20 and the fixed base 10.

A recess 26, which is of a prescribed depth from the surface 24 of the base 10 and whose length is perpendicular to the length of the seatbelt 22, is formed in the base 10 between the two pairs of brackets 16 and 18. A shock-absorbing part 28 made of rubber material is placed in and coupled to the bottom of the recess 26. In addition, a plate form receiving part 30 is coupled to the top of the shock-absorbing part 28.

The receiving part 30 sits in the recess 26 such that the top surface of the receiving part 30 is almost even with the top surface of the base 10. The receiving part 30 and the shock-absorbing part 28 are arranged and configured such that when the contact surface 32 of the receiving part 30 receives a pressing force applied toward the bottom of the recess 26, the shock-absorbing part 28 is compressed.

Figure 3:
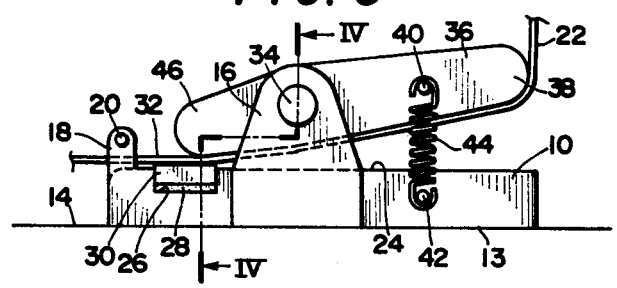
FIG. 3 illustrates the operation of the device of FIG. 1.
Figure 4:
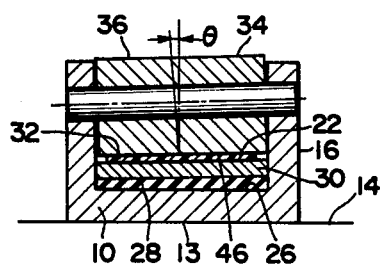
FIG. 4 is a cross sectional view along the line IV—IV in FIG. 3.

An arm 36 is rotatably supported at its approximate center on a shaft 34 provided in the brackets 16. The seatbelt 22 is turned around one end 38 of the arm 36. A tension coil spring 44 is provided between a pin 40 provided adjacent the end 38 of the arm 36 and a pin 42 provided on the fixed base 10. Accordingly, the other end of the arm 36, which acts as a pressing part 46, is driven in a direction which separates it from the receiving part 30. However, when tension on the seatbelt 22 exceeds a predetermined value, the tension on the seatbelt 22 is transmitted to the end 38 of the arm 36 thereby causing the arm 36 to rotate in a counterclockwise direction against the force of the tension coil spring 44 such that the pressing part 46 is caused to approach the receiving part 30 as shown in FIGS. 3 and 4.

Furthermore, the left end of the seatbelt 22, with reference to FIG. 1, is connected to a retractor (not shown in the Figures). The end of the seatbelt 22 which is wrapped around the end 38 of the arm 36 and which extends to restrain a passenger is also not shown in the Figures.

In operation, when the seatbelt 22 is donned by a passenger, the seatbelt 22 is pulled in the direction indicated by the arrow A. When the seatbelt 22 is thus pulled, an appropriate amount of seatbelt 22 is extended from the retractor so that the seatbelt 22 can be wrapped around the body of a passenger. In this case, the only tension acting on the seatbelt 22 is the tension caused by the retractor (not shown in the Figures). Accordingly, tension on the seatbelt 22 is samll. As a result, the seatbelt locking device is maintained in the condition illustrated in FIGS. 1 and 2 and the movement of the seatbelt 22 is not hindered by the arm 36.

When the vehicle is involved in an emergency such as a collision, the pasenger wearing the seatbelt 22 is abruptly thrown in the direction of impact. Accordingly, the seatbelt 22 moves abruptly in the direction indicated by the arrow A. Meanwhile, the retractor on which the end of the seatbelt 22 is retracted senses the emergency condition and locks the seatbelt 22 at the retractor. As a result, tension on the seatbelt 22 is abruptly increased. This tension causes the arm 36 to rotate in a counterclockwise direction about the shaft 34 so that the pressing part 46 presses the intermediate portion of the seatbelt 22 toward the receiving part 30 and clamps the seatbelt 22 against the receiving part 30. As a result, movement of the seatbelt 22 in the direction of extension of the seatbelt is prevented. Furthermore, the body of the passenger wearing the seatbelt 22 is securely restrained and the safety of the passenger is insured.

The following is a description of a situation in which there is an installation error of anlge $\theta$ between the shaft 34 and the fixed base 10 (as shown in FIG. 2). This angle $\theta$ causes the pressing force of the pressing part 46 which clamps the seatbelt 22 between the pressing part 46 and the receiving part 30 to be applied to the receiving part 30 at an inclination of anlge $\theta$. The presence of the shock absorbing part 28 behind the receiving part 30 which receives this inclined pressing force causes the position of the receiving part 30 to be corrected by angle $\theta$ so that the surface of the receiving part 30 is perpendicular to the direction from which the pressing force is received.

Accordingly, even in cases which arm 36 has installation error of angle $\theta$, the pressing part 46 can clamp the seatbelt 22 against the receiving part 30 across the entire width of the seatbelt 22. Since there is no local concentration of stress, breaking of the seatbelt 22 can be avoided. Since the shock absorbing part 28 is made from rubber, it possesses fluidity and receives the pressing force from the pressing part 46 like a fluid. As a result, it is able to support the receiving part 30 with an equal distribution of load across the entire surface of the receiving part 30.

Figure 5:
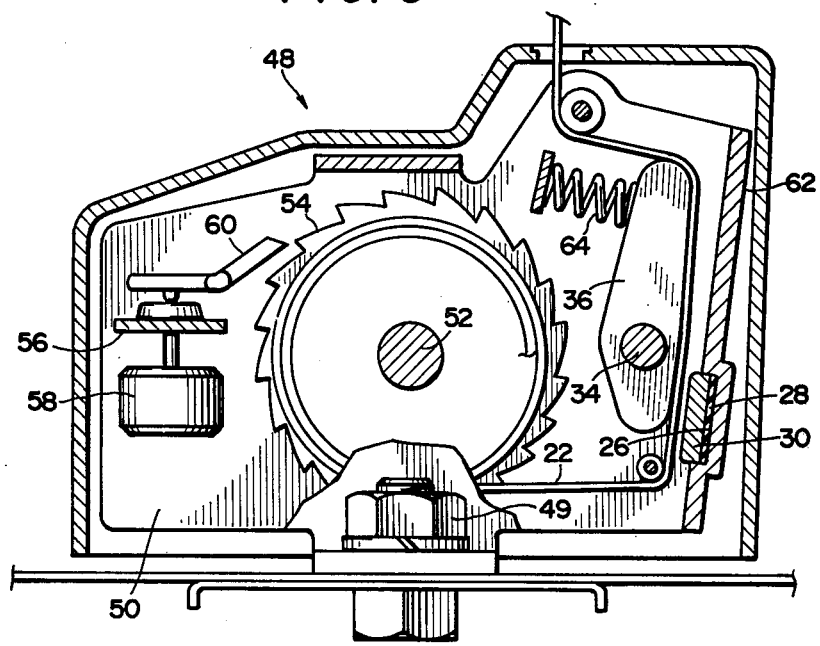
FIG. 5 is a cross sectional view illustrating a second embodiment of a seatbelt locking device in accordance with the teachings of the present invention.
Figure 6:
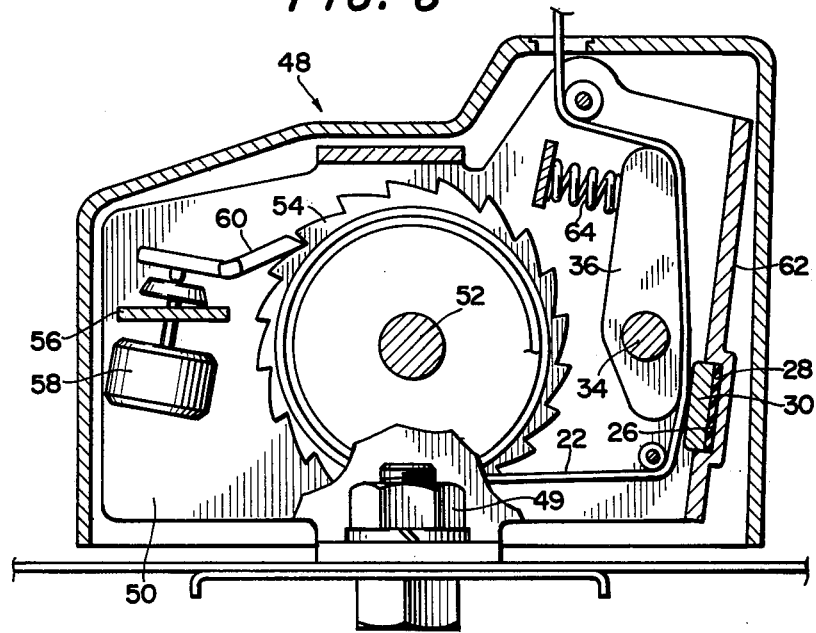
FIG. 6 illustrates the operation of the device of FIG. 5.

Referring to FIGS. 5 and 6, shown therein is a second embodiment of a seatbelt locking device in accordance with the teachings of the present invention. In this embodiments, the locking device is provided in the seatbelt retractor 48. The retractor 48 includes a retractor shaft 52 supported on a base 50 fastened to the vehicle by bolts 49. One end of the seatbelt 22 is retracted in layers on the retractor shaft 52. Furthermore, an inertial locking device is formed by a ratchet wheel 54 attached to the retractor shaft 52 and a pawl 60 which is caused to incline by a pendulum 58 which is suspended from base 50 by means of a bracket 56. This inertial locking system is designed such that under normal vehicle operating conditions (as shown in FIG. 5), the pawl 60 is kept free from the ratchet 54 by its own weight. When the pendulum 58 senses vehicle acceleration and therefore swings, the pawl 60 is caused to incline such that it engages with the ratchet wheel 54 thereby preventing rotation of the ratchet wheel 54 and retractor shaft 52 in the direction of the seatbelt 22 extension.

Furthermore, back plate 62 of the base 50 performs the same function as the fixed base described in the first embodiment. A shock-absorbing part 28 and a receiving part 30 are sunk into a recess 26 similar to that described in the first embodiment. Furthermore, a compression coil spring 64 is installed between the base 50 and the arm 36 is supported on the base 50 by a shaft 34. This spring 64 keeps the pressing part 46 separated from the receiving part 30. However, during a vehicular emergency (as shown in FIG. 6), the tension on the seatbelt 22 causes the arm 36 to rotate such that the pressing part 46 locks an intermediate portion of the seatbelt 22 between the pressing part 46 and the receiving part 30. Accordingly, it should be apparent that this second embodiment functions very similar to the first embodiment.

It should be further apprarent that while the shock-absorbing part 28 is described as being made from a rubber material, the shock-absorbing part utilized in this invention is not restricted to such a material and any material would work so long as it possesses property similar to those of rubber and is able to apply a uniform pressure to the back surface of the receiving part 30. Such materials will include soft plastic, etc. Therefore, it is apparent that any material which is able to cause the receiving part 30 to change position appropriately in accordance with the pressing force of the pressing part 46 such that the receiving part 30 faces in the direction from which the pressing force is received can be appropriately utilized.

It should be apparent to those skilled in the art that the above-described embodiments are merely illustrative of but a few of the many possible specific embodiments which represent the applications of the principles of the present invention. Numerous and varied other arrngements can be readily devised by those skilled in the art without departing from the spirit and scope of the invention.

I claim:

1. A locking device for seatbelt systems for vehicle comprising:

a base;

a receiving part provided on said base;

a pressing part which is normally separated from the receiving part so that it allows the passenger-restraining seatbelt to pass freely between the pressing part and the receiving part and clamps the seatbelt between the pressing part and the receiving part during a vehicular emergency; and a shock-absorbing part interposed between the base and the receiving part, and which is deformed by the pressing force of the pressing part so that the receiving part is caused to face in the direction from which the pressing force is received.

2. A locking device, as defined in claim 1, wherein said pressing part comprises one end of an arm supported by a shaft on the base.

3. A locking device, as defined in claim 2, wherein the seatbelt which has passed between the pressing part and receiving part is wrapped around the end of the arm opposite the end of said arm which forms the pressing part and the pressing part is caused to approach the receiving part when the tension on the seatbelt is increased.

4. A locking device, as defined in claim 3, further comprising an elastic part installed between the arm and base so that the pressing part is driven in the direction which separates it from the receiving part.

5. A locking device, as defined in claim 1, wherein the receiving part and shock-absorbing part are accommodated inside a recess formed in the base.

6. A locking device, as defined in claim 1, further comprising a retractor for said seatbelt and said retractor comprises a ratchet wheel attached to a retractor shaft and a pawl which is caused to incline by a pendulum which is caused to swing when it senses acceleration during a vehicular emergency whereby rotation of said retractor shaft in a direction of extension of the seatbelt is stopped.

* * * * *